(12) United States Patent
Shackford

(10) Patent No.: US 6,210,532 B1
(45) Date of Patent: *Apr. 3, 2001

(54) MEANS FOR CONVEYING PULP HAVING DIFFERENTIAL PRESSURE CONTROL

(76) Inventor: Lewis D. Shackford, 8 Riverside Dr., Merrimack, NH (US) 03054

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,221

(22) Filed: Aug. 7, 1997

Related U.S. Application Data

(63) Continuation of application No. 08/470,376, filed on Jun. 6, 1995, now abandoned, which is a continuation of application No. 08/288,845, filed on Aug. 11, 1994, now abandoned.

(51) Int. Cl.[7] ................................................ D21C 7/12
(52) U.S. Cl. ........................ 162/238; 162/243; 162/246
(58) Field of Search ................... 162/18, 65, 52, 162/57, 237, 243, 246, 49, 263, 238

(56) References Cited

U.S. PATENT DOCUMENTS

| | | | |
|---|---|---|---|
| 2,089,992 | * 8/1937 | Campbell et al. | 162/18 |
| 2,829,049 | * 4/1958 | Segl | 162/18 |
| 2,882,967 | * 4/1959 | Surino | 162/246 |
| 2,938,824 | * 5/1960 | Richter | 162/246 |
| 3,814,664 | 6/1974 | Carlsmith et al. | |
| 3,841,465 | * 10/1974 | Miller, Jr. et al. | 162/18 |
| 4,274,786 | * 6/1981 | Svensson et al. | 162/18 |
| 4,762,591 | * 8/1988 | Samuelson | 162/237 |
| 5,087,326 | * 2/1992 | Jones | 162/246 |
| 5,164,043 | 11/1992 | Griggs et al. | |
| 5,164,044 | 11/1992 | Griggs et al. | 162/57 |
| 5,174,861 | 12/1992 | White et al. | 162/57 |
| 5,174,864 | 12/1992 | White et al. | |
| 5,181,989 | 1/1993 | White et al. | |
| 5,188,708 | 2/1993 | Griggs et al. | |
| 5,211,811 | 5/1993 | Griggs et al. | 162/40 |

FOREIGN PATENT DOCUMENTS

| | | | |
|---|---|---|---|
| 646267 | 6/1994 | (AU) | |
| 2046717 | 7/1991 | (CA) | |
| 492 040 | * 7/1992 | (EP) | 162/65 |
| 2 378 125 | 8/1978 | (FR) | |
| 2 620 744 | * 9/1987 | (FR) | 162/65 |
| 2 672 314 | 8/1992 | (FR) | |
| 1 599 092 | 9/1981 | (GB) | |
| 53-111102 | 9/1978 | (JP) | |
| 62-69892 | 3/1987 | (JP) | |
| 6-57672 | 3/1994 | (JP) | |

* cited by examiner

*Primary Examiner*—Steve Alvo

(57) ABSTRACT

A walled passageway, having openings therein only at opposite, inlet and outlet ends thereof, has a shaft journalled therein. The shaft carries a screw thereon for moving shredded pulp through the passageway. The screw is foreshortened, having a length less than that of the passageway, and causes inlet-admitted pulp to form into a continuously moving pulp plug. The plug, albeit having some porosity, comprises a gas seal within the passageway, and inhibits any migration of downstream gas from escaping to the atmosphere via the passageway and the inlet thereof. In addition, a source of oxygen or such gas as is inert to any downstream process is controllingly admitted into the inlet to maintain an upstream pressure equal to, or greater than any downstream process pressure to insure against release of downstream gas into the atmosphere.

4 Claims, 1 Drawing Sheet

MEANS FOR CONVEYING PULP HAVING DIFFERENTIAL PRESSURE CONTROL

This application is a continuation of application Ser. No. 08/470,376 filed on Jun. 6, 1995, and now abandoned.

BACKGROUND OF THE INVENTION

This application is a continuation of application Ser. No. 08/288.845, filed Aug. 11, 1994 now abandoned.

This invention pertains to wood pulp bleaching processes, such as those which Employ gaseous bleaching reagents contacted with high consistency (i.e. twenty percent or more) fluffed pulp, and in particular to a means for gas-sealingly conveying shredded pulp, in a pulp-handling process, to a downstream vessel or device.

Wood pulp bleaching with gaseous reagents, such as ozone and other high reaction rate gases, promises significant reduction of objectionable pulp mill effluents to streams and other bodies of water, as well as reduction of objectionable gaseous emissions. Elimination of chlorine compounds from the bleaching sequence promises great economic and ecological benefits. However, incorporation of these bleaching reagents can impose significant capital costs on the pulp mill due to the use of pulp transport devices which are expensive and generally require frequent maintenance.

In the use of a bed type reactor, for example, such as described in U.S. Pat. No. 3,814,664, issued to Carlsmith, et al, a thick stock pump is required to feed the pulp to the fluffer while sealing the vessel pressure from the thickening device which generally operates under atmospheric pressure. In another method, described in U.S. Pat. Nos. 5,181,989; 5,164,043; and 5,164,044 issued to Griggs, et al, and U.S. Pat. Nos. 5,174,861; 5,211,811; and 5,188,708 issued to White, et al, a screw feeding device is used to transport the pulp to the fluffer, again while sealing the vessel pressure from the thickening device which operates under atmospheric pressure.

SUMMARY OF THE INVENTION

It is a purpose of this invention to disclose an efficient and inexpensive means for gas-sealingly conveying shredded pulp, from a thickening device to a downstream vessel, without having to employ a thick stock pump, a screw feeder, or such other expensive and high-maintenance equipment.

Particularly, it is a purpose of this disclosure to define means for gas-sealingly conveying shredded pulp, comprising a pulp conveyor having a pulp inlet and a pulp outlet; wherein said conveyor has openings only at said inlet and said outlet; and conduit means in communication with said inlet for admitting shredded pulp into said inlet; and said conveyor comprises means for transforming inlet admitted, shredded pulp into a substantially effective, translating, gas seal between said inlet and said outlet.

The aforesaid, and further purposes and features of this invention, will become apparent by reference to the following description, taken in conjunction with the accompanying figures.

DESCRIPTION OF THE PREFERRED EMBODIMENTS

Figure 1:
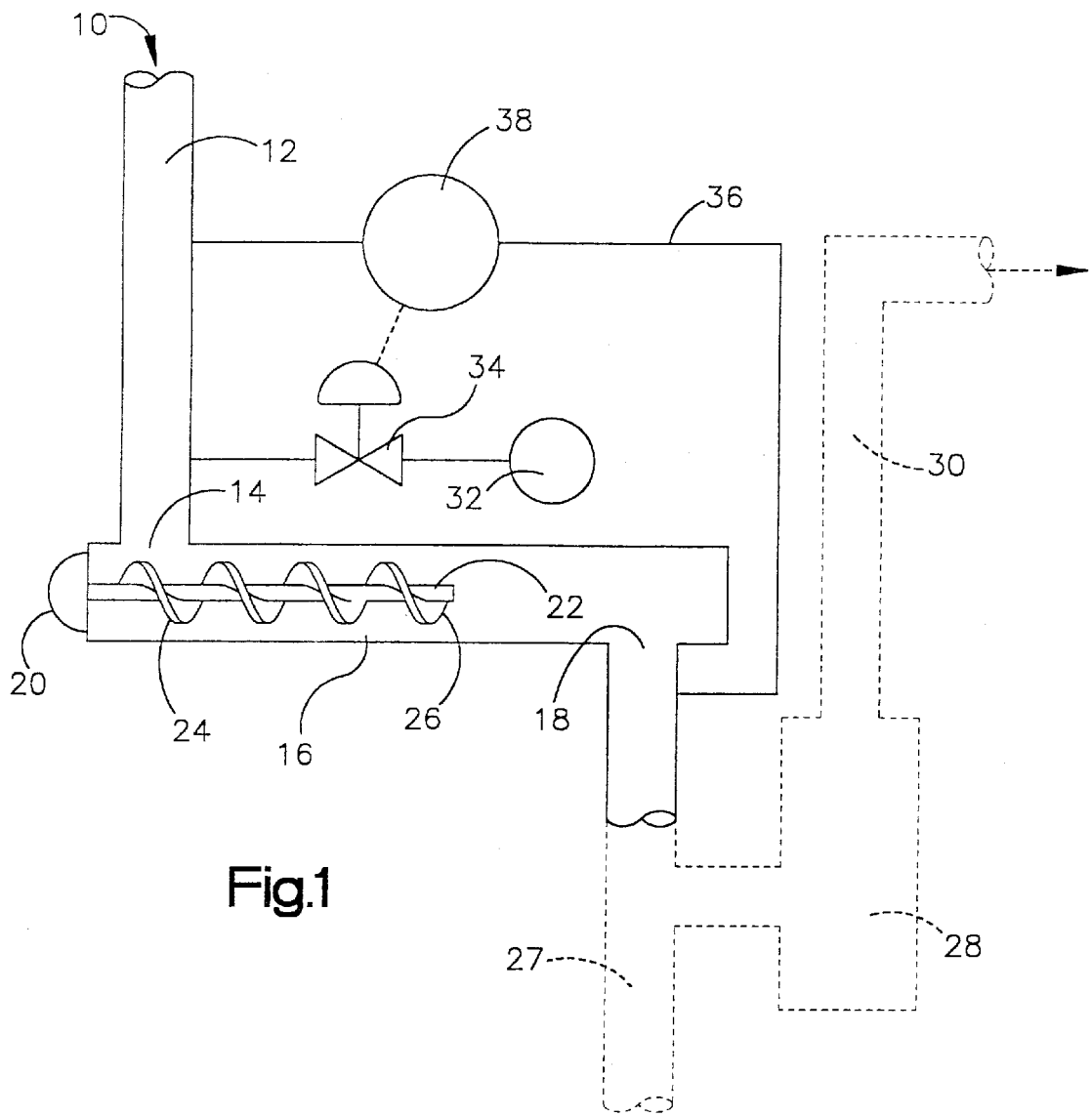
FIG. 1 is a schematic diagram of a shredded pulp conveying means, according to an embodiment of the invention.

In gas phase bleaching of pulp, the pulp is first thickened to a high consistency, i.e., twenty percent or more, in a thickening device. By way of example, such a thickening device can be a twin roll press (not shown) which discharges the pulp to a breaker/shredder conveyor (not shown). Regardless of from whence the shredded pulp is derived, the same is represented by the arrow 10, in FIG. 1, as the source thereof. The sourced, shredded pulp is conducted to a conduit 12 which is in open communication with the inlet 14 of a pulp conveyor 16. The conveyor 16 has an outlet 18 at the end thereof which is opposite the inlet 14, and the inlet 14 and outlet 18 are the only openings in the conveyor 16. The conveyor is otherwise a walled passageway. Journalled in the conveyor 16, for rotation therein, by means of a motor 20, is a shaft 22 which carries thereon a screw 24. The screw 24 has a length which is less than that of the conveyor 16, one end of the screw 24 being in alignment with the inlet 14. The terminal end 26 of the screw 24, then, is distanced from the outlet 18. Shredded pulp is admitted into the inlet 14, from the conduit 12, for movement thereof along the conveyor 16 by the rotatable screw 24. As a consequence, the admitted pulp forms into a porous plug downstream of the screw 24. Typically, in a gas phase bleaching of pulp, downstream of the conveyor 16 would be a vessel having a gaseous reagent which may be toxic or otherwise objectionable. Consequently, it is important to insure that the relevant gas does not leak or insinuate itself through the conveyor 16 for release into the atmosphere. Under operating conditions, then, the screw 24 and conveyor 16-formed porous plug serves as the sealing medium. The continuously-admitted shredded pulp is caused to transform into a continuously moving plug, advancing toward the outlet 18, which inhibits a migration of the downstream gas in the opposite direction.

The outlet 18, optionally, can communicate with an immediate discharge conduit 27, shown only in phantom, for conduct therefrom to an ozone contactor. Too, depending upon the process requirements, the outlet can be in communication with a shredding or fluffing device 28 (shown only in phantom), if further shredding or fluffing of the pulp is required. Then, the pulp can be conducted, via a conduit 30 (shown only, in phantom) to a downstream reaction vessel.

As noted, under dynamic conditions of continuous plug transport through the conveyor 16, the continuously forming and moving plug will serve as the only required gas sealing between ends of the conveyor, and the inlet 14 and outlet 18. During system shutdown, however, when the advance of the plug is halted, it is possible that gas will weep through the halted plug and get released to the atmosphere. The invention comprehends means for addressing this matter. In order to maintain reliability of the gas sealing, the invention is enhanced by incorporating a control means whereby oxygen, or other suitable gas which is inert in the downstream process, is added in relatively small quantities to maintain a pressure somewhat higher in the feed to the sealing conveyor 16, as compared to the pressure downstream. As shown in FIG. 1, a source 32 of oxygen, for instance, is communicated to the conduit 12, via a control valve 34. In this manner, a small quantity of gas passes through the porous plug to the downstream processing, it being arranged that the quantity and type of gas (oxygen or other) does not have a negative impact on the downstream ministrations. The functionality is provided by automatically controlling the pressure in the inlet 14 at or above the pressure under which the downstream process is operating. For example, the invention sets forth maintaining an upstream pressure of from one-tenth to five psig above the downstream process pressure. In the disclosed embodiment, this control is effected by bridging across the inlet 14 and outlet 18 with a pressure-sensing line 36 which has incorporated therein a differential pressure control 38, the latter being linked to the valve 34 for supervisory operation thereof.

Figure 2:
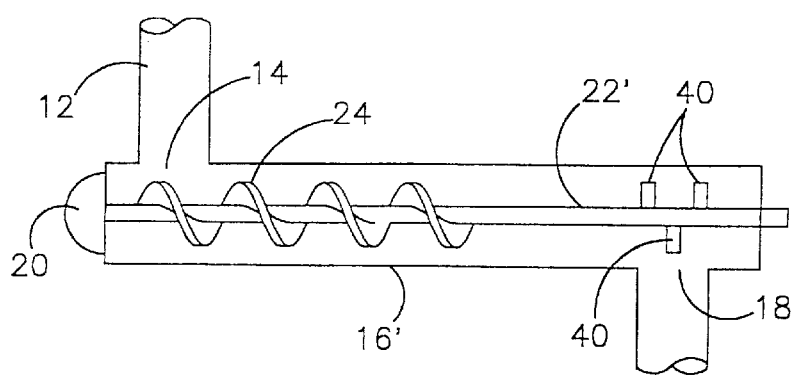
FIG. 2 is a diagram of an alternate embodiment of the pulp conveyor of FIG. 1.

FIG. 2 shows an alternate embodiment of the pulp conveyor 16' in which the journalled shaft 22', which carries the screw 24 thereon, is journalled in the outlet end of the conveyor (as well as in the inlet end thereof). In adjacency to the far or downstream end of the shaft 22' is provided a plurality of perpendicularly-disposed breaker bars 40. Bars 40 further break up the pulp, particularly the pulp plug, to accommodate the passage of the pulp through the outlet 18.

The invention advances the art, in that it allows for the replacement of a high cost, high maintenance, positive displacement feeder with a simple, inexpensive, conveyor-type screw 24. Further, it reduces the compaction forces to which the pulp is subjected in conventional feeding devices to a minimal amount of compaction in the porous plug. Those skilled in the art will recognize that the reduction or elimination of compacting forces will substantially improve the fluff quality obtained in downstream devices, and will thereby reduce the quantity of reactant gas required for the receiving process.

It is a teaching of this invention that it is possible to eliminate a high maintenance, high cost device in such systems while providing for enhanced performance of the downstream fluffing and reaction system, thereby reducing the cost, and improving the system performance.

While I have described my invention in connection with specific embodiments thereof, it is to be clearly understood that this is done only by way of example, and not as a limitation of the invention as set forth in the purposes thereof and in the appended claims. Benefiting from my disclosure herein, others will find a plurality of procedures for conveying shredded pulp without unduly compacting the same before discharging the pulp to a downstream vessel or device, and conveyance of the pulp without permitting downstream gaseous reagents, or the like, from passing through the conveyor 16 and venting upstream. In a first procedure, it is only required to design the conveyor 16 and the cooperating screw 24 to insure that the plug, which is formed ahead of the screw 24, is of sufficient length that it adequately accomplishes the necessary gas sealing through the conveyor 16. Alternatively, the employment of the source 32 of pressurizing gas (oxygen, or such), and the line 36, control valve 34 and control 38 is deemed a useful expedient should it become necessary to prevent gas leakage through the conveyor 16 toward the inlet 14 at shut-down. If it is deemed warranted to use a shorter length conveyor 16 which will not provide for a pulp plug having a sufficient length to prevent gas leakage through the conveyor 16, the differential pressure arrangement can be employed as an integral part of the system. In this, of course, the source 32 can provide a continuous, slightly elevated pressure at the inlet 14 all during system operation. Then, with shut-down, if it is necessary to raise the pressure at the inlet 14, the differential pressure arrangement is in place to accommodate for this. All of these operational methods are comprehended by this invention, and within the ambit of the appended claims.

I claim:

1. A high consistency pulp conveyor for use in a process for gas phase bleaching of wood pulp comprising:

a housing having an inlet, an outlet and a conduit, the conduit communicating with the outlet and being connected to a bleaching vessel;

a single, screw-type conveyor rotatably mounted within the housing, the single, screw-type conveyor being disposed within the housing between the inlet and outlet and having one end aligned with the inlet and an opposite, terminal end spaced apart from the outlet by a distance;

the screw-type conveyor forming a moving pulp plug downstream of the conveyor and along said distance between the terminal end of the conveyor and the outlet;

said distance between the terminal end of the conveyor and the outlet being characterized by the absence of means for disrupting the moving pulp plug;

the moving pulp plug has a predetermined length which is sufficient to prevent the flow of gas from the outlet to the inlet, the predetermined length being at least said distance between the terminal end of the conveyor and the outlet of the housing;

a pressure sensing line communicating with the housing inlet and the housing outlet and having a differential pressure control incorporated therein;

a supply of gas connected to the housing inlet to maintain a greater pressure within the housing inlet as compared to a pressure within the housing outlet; and a control valve linked to the differential pressure control.

2. The high consistency pulp conveyor according to claim 1 further comprising:

a pulp breaker rotatably mounted at the outlet of the housing;

wherein the pulp breaker is spaced apart from the terminal end of the conveyor by said distance and is substantially aligned with the outlet of the housing.

3. The high consistency pulp conveyor according to claim 1, wherein the housing has a first end and a second end, the screw-type conveyor having a shaft journaled in the first and second end of the housing, the shaft extending past the outlet of the housing.

4. A high consistency pulp conveyor for use in a process for gas phase bleaching of wood pulp comprising:

a housing having an inlet, an outlet, and conduit, the conduit communicating with the outlet and being connected to a bleaching vessel;

a screw type conveyor rotatably mounted within the conveyor region of the housing, the conveyor having a discharge spaced from the outlet by a distance, the screw type conveyor forming a continuous pulp plug at a discharge of the conveyor and discharging the pulp plug along the distance between the discharge of the conveyor and the outlet of the housing and through the outlet to the bleaching vessel via the conduit during a gas phase bleaching operation;

the screw type conveyor conveying the moving pulp plug without disrupting the moving pulp plug along the distance between the discharge and the outlet and through the outlet, said distance being characterized by the absence of means for disrupting the pulp plug, the pulp plug extending along said distance and forming a gas seal plug to prevent the flow of gas from the outlet to the inlet while conveying the pulp during a gas phase bleaching operation;

a pressure sensor for sensing a differential pressure between the housing inlet and the housing outlet;

a supply of gas connected to the housing inlet for supplying pressurized gas to the inlet based on the sensed differential pressure so as to maintain a greater pressure within the housing inlet as compared to a pressure within the housing outlet.

\* \* \* \* \*